(12) United States Patent
Lynch et al.

(10) Patent No.: US 10,960,323 B1
(45) Date of Patent: Mar. 30, 2021

(54) SYSTEM AND METHOD FOR EXTRACTING BOTANICAL HERBAL OIL

(71) Applicants: Thomas Lynch, San Jose, CA (US); Austin Carter, Los Gatos, CA (US)

(72) Inventors: Thomas Lynch, San Jose, CA (US); Austin Carter, Los Gatos, CA (US)

(*) Notice: Subject to any disclaimer, the term of this patent is extended or adjusted under 35 U.S.C. 154(b) by 0 days.

(21) Appl. No.: 16/688,304

(22) Filed: Nov. 19, 2019

(51) Int. Cl.
  *B01D 11/02* (2006.01)
  *C11B 1/10* (2006.01)

(52) U.S. Cl.
  CPC ...... *B01D 11/0296* (2013.01); *B01D 11/0219* (2013.01); *B01D 11/0288* (2013.01); *C11B 1/108* (2013.01)

(58) Field of Classification Search
  CPC ............ B01D 11/0296; B01D 11/0219; B01D 11/0288; C11B 1/108
  USPC .......................................................... 554/21
  See application file for complete search history.

(56) References Cited

FOREIGN PATENT DOCUMENTS

KR      20120072406 A    *  7/2012

* cited by examiner

*Primary Examiner* — Deborah D Carr
(74) *Attorney, Agent, or Firm* — Michael J. Feigin, Esq.; Feigin and Fridman LLC

(57) ABSTRACT

A system and method for extracting botanical herbal oil is disclosed. The method includes washing plant material with liquid solvent forming a solvent-oil extract solution, pumping the solvent-oil extract solution to an atomizer, pumping vapor solvent to the atomizer, atomizing the solvent-oil extract solution with vapor solvent forming an atomized mixture, and vaporizing the atomized mixture to isolate the botanical herbal oil from the mixture. The system includes a first pressure vessel to chill a solvent, a second pressure vessel to wash plant material with liquid solvent forming a solvent-oil extract solution, an atomizer to mix the solvent-oil extract solution with vapor solvent forming an atomized mixture, a liquid transfer pump to pump the solvent-oil extract solution to the atomizer, a vapor transfer pump to pump the vapor solvent to the atomizer, and a vaporizer to vaporize the atomized mixture and isolate the botanical herbal oil.

20 Claims, 2 Drawing Sheets

100

105 — Washing botanical herbal oil from plant material with a liquid solvent to form a solvent-oil extract solution 110 — Pumping the solvent-oil extract solution to an atomizer 115 — Pumping a vapor solvent to the atomizer 120 — Atomizing the solvent-oil extract solution with the vapor solvent via the atomizer to form an atomized mixture 125 — Vaporizing the liquid solvent from the atomized mixture to isolate the botanical herbal oil from the solvent-oil extract solution

SYSTEM AND METHOD FOR EXTRACTING BOTANICAL HERBAL OIL

FIELD OF THE DISCLOSED TECHNOLOGY

The disclosed technology relates to a system and method of extracting botanical herbal oil. More specifically, the disclosed technology relates to a system and method for extracting botanical herbal oil by atomizing a solvent-oil extract solution with a vapor prior to the vaporization of the solvent from the solvent-oil extract solution.

BACKGROUND OF THE DISCLOSED TECHNOLOGY

Botanical herbal oil extraction methods employ solvents to isolate desired oils from plant material. Current methods soak the plant material with a liquid solvent for a period and then filter the plant material from the solvent. What is left is a liquid solution including the solvent and any extracted botanical herbal oil. After the plant material is filtered, the liquid solution is heated to vaporize the solvent out from the solution and isolate the botanical herbal oil. These steps typically occur in a closed system wherein the plant material is soaked with the solvent in one vessel and the liquid solution is transferred to an evaporation chamber, in its liquid or original phase, for isolation of the botanical herbal oil. However, this process is slow in that the liquid solution is heated as a mass, either as a pool or a thinner film, which prolongs the solvent's rate of vaporization from the liquid solution. Therefore, a quicker rate of solvent vaporization is required in order to create a faster, more efficient system and method for extracting botanical herbal oil, which yields better results.

Accordingly, there is a need for a system and method for extracting botanical herbal oil that includes a means of increasing the rate of vaporization of a solvent from a solvent-oil extract solution.

SUMMARY OF THE DISCLOSED TECHNOLOGY

Disclosed herein is a method for extracting botanical herbal oil from plant material including washing botanical herbal oil from plant material with a liquid solvent to form a solvent-oil extract solution, pumping the solvent-oil extract solution to an atomizer, pumping a vapor solvent to the atomizer, atomizing the solvent-oil extract solution with the vapor solvent via the atomizer to form an atomized mixture, and vaporizing the liquid solvent from the atomized mixture to isolate the botanical herbal oil from the solvent-oil extract solution.

In embodiments, the atomizer is a dual port sprayer including a first port to receive the solvent-oil extract solution and a second port to receive the vapor solvent and an injection nozzle to atomize the solvent-oil extract solution with the vapor solvent.

In embodiments, the liquid solvent and the vapor solvent is propane, butane, hexane, ethanol, methanol, ether, dimethylformamide, carbon dioxide, water, N-propanol, butanol, dichloromethane carbon disulfide, glycerol, acetone, carbon tetrachloride, cyclohexane, formic acid, toluene, anisole, pyridine, acetic acid, xylene, trifluoroacetic acid, dimethyl sulfoxide, benzene, nitrobenzene, quinoline, dibutyl phthalate, tetrahydrofuran, petroleum ether, or any combination thereof.

In some embodiments, method further includes pumping the solvent-oil extract solution to the atomizer with a liquid transfer pump and pumping the vapor solvent to the atomizer with a vapor transfer pump.

In some embodiments, the method includes transferring the atomized mixture into an evaporation chamber with the atomizer before vaporizing the liquid solvent from the atomized mixture.

In certain embodiments, the method includes chilling a solvent in a first pressure vessel until at least a portion of the solvent condenses into a liquid to form the liquid solvent. In embodiments, the liquid solvent and the vapor solvent are acquired from the solvent. In one embodiment, the liquid solvent is drawn from a bottom portion of the first pressure vessel containing the liquid solvent and the vapor solvent is drawn from an upper portion of the first pressure vessel containing the vapor solvent.

In other embodiments, the method includes soaking the plant material with the liquid solvent in a second pressure vessel before washing the botanical herbal oil from the plant material.

In embodiments, the method includes transferring the liquid solvent from the first pressure vessel into the second pressure vessel containing the plant material to begin the soaking.

In some embodiments, filtering the solvent-oil extract solution from the plant material to separate the solvent-oil extract solution from the plant material before pumping the solvent-oil extract solution to the atomizer.

In certain embodiments, the method includes pumping the solvent-oil extract solution from the second pressure vessel to the atomizer after the solvent-oil extract solution is filtered from the plant material.

In other embodiments, the method includes draining the botanical herbal oil from the evaporation chamber for further processing.

In embodiments, the method includes condensing the liquid solvent vaporized from the atomized mixture back to a liquid solvent.

In some embodiments, the method includes condensing the liquid solvent vaporized from the atomized mixture back to a liquid solvent with a heat exchanger.

Also disclosed is a botanical herbal oil extraction system including a first pressure vessel to chill a solvent a second pressure vessel to soak plant material with a liquid solvent of the solvent to extract botanical herbal oil from the plant material and form a solvent-oil extract solution, an atomizer to mix the solvent-oil extract solution with a vapor solvent of the solvent to form an atomized mixture and to transfer the atomized mixture, a liquid transfer pump to pump the solvent-oil extract solution to the atomizer, a vapor transfer pump to pump the vapor solvent to the atomizer, an evaporation chamber to receive the transferred atomized mixture and to contain the atomized mixture, a vaporizer to vaporize the liquid solvent from the atomized mixture and isolate the botanical herbal oil from the solvent-oil extract solution, a condenser to condense the liquid solvent vaporized from the atomized mixture back to a liquid solvent, and a drain to drain the botanical herbal oil extract from the evaporation chamber.

In some embodiments, the system includes a second drain to drain the liquid solvent from the first pressure vessel to the second pressure vessel, a filter to filter the solvent-oil extract solution from the plant material, a third drain to drain the solvent-oil extract solution from the second pressure vessel, and a pump to pump the liquid solvent vaporized from the atomized mixture to the condenser and to the first pressure vessel.

In one embodiment, the first pressure vessel contains the liquid solvent and the vapor solvent.

In embodiments, the atomizer is a dual port sprayer including a first port to receive the solvent-oil extract solution and a second port to receive the vapor solvent and an injection nozzle to atomize the solvent-oil extract solution with the vapor solvent. In some embodiments, the condenser includes a heat exchanger.

For purposes of this disclosure, the following definitions are used. "Botanical" is defined as "relating to plants and plant materials." "Herbal" is defined as "relating to or made from herbs used for cooking, therapeutic, medicinal, and/or recreational purposes." "Extract" is defined as "to selectively remove or take out desired or specific compounds from a substance, or a preparation containing a desired ingredient of a substance in concentrate form." "Solvent" is defined as "a molecule that has the ability to dissolve other molecules, and/or the fluid in which a solute, e.g., botanical herbal oil, is dissolved to form a solution." "Liquid solvent" is defined as "a solvent existing in a liquid phase." "Vapor solvent" is defined as "a solvent existing in a gaseous or vapor phase." "Wash" is defined as "to selectively remove specific, desired, or unwanted compounds from a substance, e.g., plant material, using a solvent." "Washing" is defined as "the process for selectively removing specific, desired, or unwanted compounds from a substance, e.g., plant material, using a solvent." "Atomize" is defined as "converting (a substance, such as solution) into very fine particles, particulates, or droplets." "Atomizer" is defined as "a device for emitting fluids as a fine spray and/or converting or mixing fluids into a fine spray." "Particulate" is defined as "relating to or in the form of minute separate particles." "Vaporize" is defined as "to convert or be converted into vapor." "Vapor" is defined as "a substance diffused or suspended in the air or in a vacuum environment, especially one normally liquid or solid." "Vaporizer" is defined as "a device used to vaporize a substance." "Pump" is defined as "a mechanical device using suction or pressure to raise or move liquids, compress gases, or force air into objects such as vessels, reservoirs, tanks, or containers and/or to force a fluid to move by or as if by means of a mechanical pump." "Liquid transfer pump" is defined as "a mechanical device using suction or pressure to move a liquid." "Vapor transfer pump" is defined as "a mechanical device using suction or pressure to move a vapor." "Pressure vessel" is defined as "a container designed to hold chemicals, materials, and the like at high and/or low pressures and temperatures." "Condense" is defined as "to change or cause to change a substance from a gas or vapor to a liquid." "Condenser" is defined as "an apparatus or container for condensing a vapor or a gas." "Heat exchanger" is defined as "a device for transferring heat from one medium to another." "Jacket" is defined as "a cavity external to a vessel that permits the uniform exchange of heat between the fluid circulating in it and the walls of the vessel."

Any device or step to a method described in this disclosure can comprise or consist of that which it is a part of, or the parts which make up the device or step. The term "and/or" is inclusive of the items which it joins linguistically and each item by itself. "Substantially" is defined as at least 95% of the term being described and/or "within a tolerance level known in the art and/or within 5% thereof. Any device or aspect of a device or method described herein can be read as "comprising" or "consisting" thereof.

DETAILED DESCRIPTION OF EMBODIMENTS OF THE DISCLOSED TECHNOLOGY

The present disclosed technology provides a system and method for extracting botanical herbal oil from plant material. The method includes washing botanical herbal oil from plant material with a liquid solvent to form a solvent-on extract solution, pumping the solvent-on extract solution to an atomizer, pumping a vapor solvent to the atomizer, atomizing the solvent-oil extract solution with the vapor solvent via the atomizer to form an atomized mixture, and vaporizing the liquid solvent from the atomized mixture to isolate the botanical herbal oil from the solvent-oil extract solution. The system includes a first pressure vessel to chill a solvent, a second pressure vessel to soak plant material with a liquid solvent of the solvent to extract botanical herbal oil from the plant material and form a solvent-oil extract solution, an atomizer to mix the solvent-oil extract solution with a vapor solvent of the solvent to form an atomized mixture and to transfer the atomized mixture, a liquid transfer pump to pump the solvent-oil extract solution to the atomizer, a vapor transfer pump to pump the vapor solvent to the atomizer, an evaporation chamber to receive the transferred atomized mixture and to contain the atomized mixture, a vaporizer to vaporize the liquid solvent from the atomized mixture and isolate the botanical herbal oil from the solvent-oil extract solution a condenser to condense the liquid solvent vaporized from the atomized mixture back to a liquid solvent, and a drain to drain the botanical herbal oil extract from the evaporation chamber.

Embodiments of the disclosed technology will become clearer in view of the following description of the figures.

Figure 1:
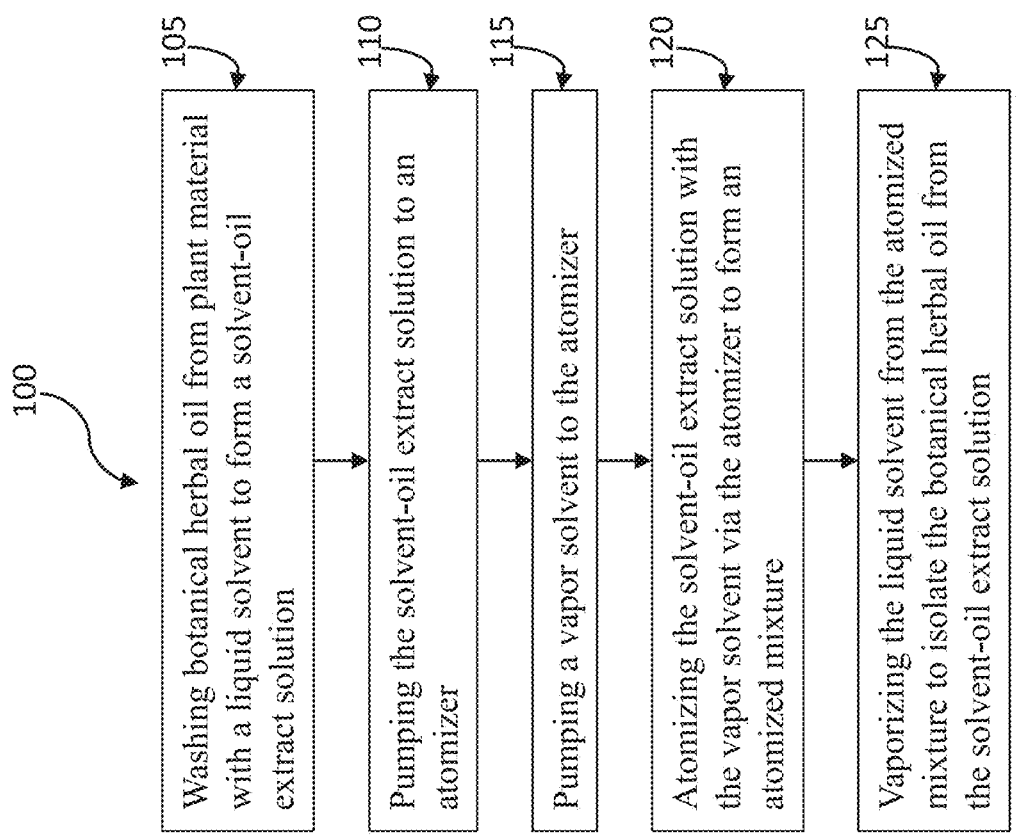
FIG. 1 shows a flow chart of the method of the present disclosed technology according to one embodiment.

Referring now to FIG. 1, there is shown a flow chart of the method of the present disclosed technology according to one embodiment. The present disclosed technology provides a method of extracting botanical herbal oil from plant material 100. The method of extracting botanical herbal oil 100 includes washing botanical herbal oil from plant material with a liquid solvent to form a solvent-oil extract solution 105, pumping the solvent-oil extract solution to an atomizer 110 pumping a vapor solvent to the atomizer 115, atomizing the solvent-oil extract solution with the vapor solvent via the atomizer to form an atomized mixture 120, and vaporizing the liquid solvent from the atomized mixture to isolate the botanical herbal oil from the solvent-oil extract solution 125. Washing the botanical herbal oil from the plant material 105 includes stripping the plant material of specific and/or targeted chemicals or chemical compounds, e.g., oils and the like, present in the plant material with the liquid solvent. The resultant solvent-oil extract solution includes the liquid solvent employed to strip the plant material of the oils as well as the oils themselves.

Pumping the solvent-oil extract solution to the atomizer 110 includes drawing the solvent-oil extract solution that has been separated from the plant material and directing it to the atomizer. In some embodiments, the solvent-oil extract solution is pumped via a liquid transfer pump, or a pump configured to draw and relocate liquid substances.

Pumping the vapor solvent to the atomizer 115 includes drawing a vapor solvent, e.g., a solvent existing in its vapor phase, to the atomizer. In embodiments, both the solvent-oil extract solution and the vapor solvent are pumped simultaneously to the atomizer such that they arrive at the atomizer concomitantly. In some embodiments, the vapor solvent is pumped via a vapor transfer pump, or a pump configured to draw and relocate vaporized or vapor substances.

In embodiments, a gaseous solvent is chilled in a first pressure vessel until at least a portion of the solvent condenses into a liquid to form the liquid solvent used for washing the plant material in step 105. In some embodiments, the first pressure vessel comprises a tank, for example a recovery tank. In embodiments, the solvent is chilled to a temperature ranging between 0 to −100 degrees Celsius. In some embodiments, the solvent is chilled to −20 to −60 degrees Celsius. In one embodiment, the solvent is chilled to −40 degrees Celsius. When the solvent is chilled in the first pressure vessel, not all of the solvent is condensed to its liquid state rather a portion of the solvent remains in its gaseous phase or a vapor phase. In embodiments, this vapor solvent is the vapor solvent pumped to the atomizer in step 115. For example, when the solvent is chilled in the first pressure vessel, any solvent condensed into a liquid solvent will pool or collect at a bottom portion of the first pressure vessel, while the solvent that remains in the gaseous/vapor phase will gather at an upper portion of the first pressure vessel.

In operation, the liquid solvent is drawn from the bottom portion of the first pressure vessel and the vapor solvent is drawn from the upper portion of the first pressure vessel. Thus, in certain embodiments, the liquid solvent and the vapor solvent pumped to the atomizer are derived from the same solvent or solvents. In embodiments, the solvent comprises one or more solvents. In one embodiment, the solvent includes a combination of butane, propane, and/or ethanol to wash the plant material. In other embodiments, the solvent includes hexane, methanol, ether, dimethylformamide, carbon dioxide, water, N-propanol, butanol, dichloromethane, carbon disulfide, glycerol, acetone, carbon tetrachloride, cyclohexane, formic acid, toluene, anisole, pyridine, acetic acid, xylene, trifluoroacetic acid, dimethyl sulfoxide, benzene, nitrobenzene, quinoline, dibutyl phthalate, tetrahydrofuran, petroleum ether, or any combination thereof.

In embodiments, the plant material is soaked with the liquid solvent in a second pressure vessel before washing the botanical herbal oil from the plant material with the liquid solvent 105. The plant material is soaked with the liquid solvent for a predetermined period of time in order to adequately wash and extract the oils from the plant material. In some embodiments, the second pressure vessel comprises a material column that original contains the plant material prior to soaking. In some embodiments, the plant material is soaked with the liquid solvent for at least twenty-four (24) hours. In other embodiments, the plant material is soaked with the liquid solvent for at least one (hour), or sixty (60) minutes. In one embodiment, the plant material is soaked with the liquid solvent for at least thirty (30) minutes. In another embodiment, the plant material is soaked with the liquid solvent for at least ten (10) minutes. In yet another embodiment, the plant material is soaked with the liquid solvent for a duration of time ranging between five (5) to fifteen (15) minutes.

In embodiments, the liquid solvent is transferred from the first pressure vessel into the second pressure vessel containing the plant material to begin the soaking and washing 105. In some embodiments, the liquid solvent is transferred from the first pressure vessel to the second pressure vessel via a drain valve or pump that connects the first pressure vessel to the second pressure vessel.

In embodiments, the solvent-oil extract solution is filtered from the plant material to separate the solvent-oil extract solution from the plant material before the solvent-oil extract solution is pumped to the atomizer in step 110. The filter comprises a desiccant, a basket strainer, filtration plate, a sand filter, gravel filter, silica filter, a glass filter, carbon filter, a screen gasket, or any combination thereof.

In embodiments, the solvent-oil extract solution is pumped from the second pressure vessel to the atomizer 110 after the solvent-oil extract solution is filtered from the plant material.

In embodiments, the atomized mixture of step 120 is transferred to an evaporation chamber with the atomizer before vaporizing the liquid solvent from the atomized mixture in step 125. In embodiments, the atomizer comprises a dual port sprayer including a first port to receive the pumped solvent-oil extract solution 110, a second port to receive the pumped vapor solvent 115, and an injection nozzle to atomize the solvent-oil extract solution with the vapor solvent in step 120. In operation, the atomizer receives the pumped solvent-oil extract solution 110 in the first port and the pumped vapor solvent 115 in the second port and atomizes them directly into the evaporation chamber as a mist including very fine droplets or particulates of solvent-oil extract solution, e.g., the atomized mixture of step 120. The atomizer employs the vapor solvent to break down, or separate, the solvent-oil extract solution into smaller particles than it normally would have been able to, had the atomizer atomized the solvent-oil extract solution by itself. By creating a more particulate solution to be vaporized, e.g., by separating the original solvent-oil extract solution into smaller droplets, the rate of vaporization of the liquid solvent from the solution can be increased, since the size of the particle being evaporated is a function of the rate of vaporization of the liquid solvent within the particle.

In embodiments, vaporizing the liquid solvent from the atomized mixture to isolate the botanical herbal oil from the solvent-oil extract solution in step 125 includes heating or pressurizing the atomized mixture or droplets to the boiling point of the solvent but below the boiling point of the botanical herbal oil, thereby evaporating the solvent, only, from the atomized mixture.

In embodiments, the final, or fully extracted, botanical herbal oil is drained from the evaporation chamber for further processing after the liquid solvent is vaporized from the atomized mixture in step 125. In one embodiment, the botanical herbal oil is drained via a drain valve. In another embodiment, the botanical herbal oil is drained via a pump that draws the botanical herbal oil from the evaporation chamber and relocates it to a separate container.

In embodiments, the liquid solvent vaporized from the atomized mixture in step 125 is condensed back to a liquid solvent. In one embodiment, the liquid solvent vaporized from the atomized mixture is condensed back to a liquid solvent with a heat exchanger.

Figure 2:
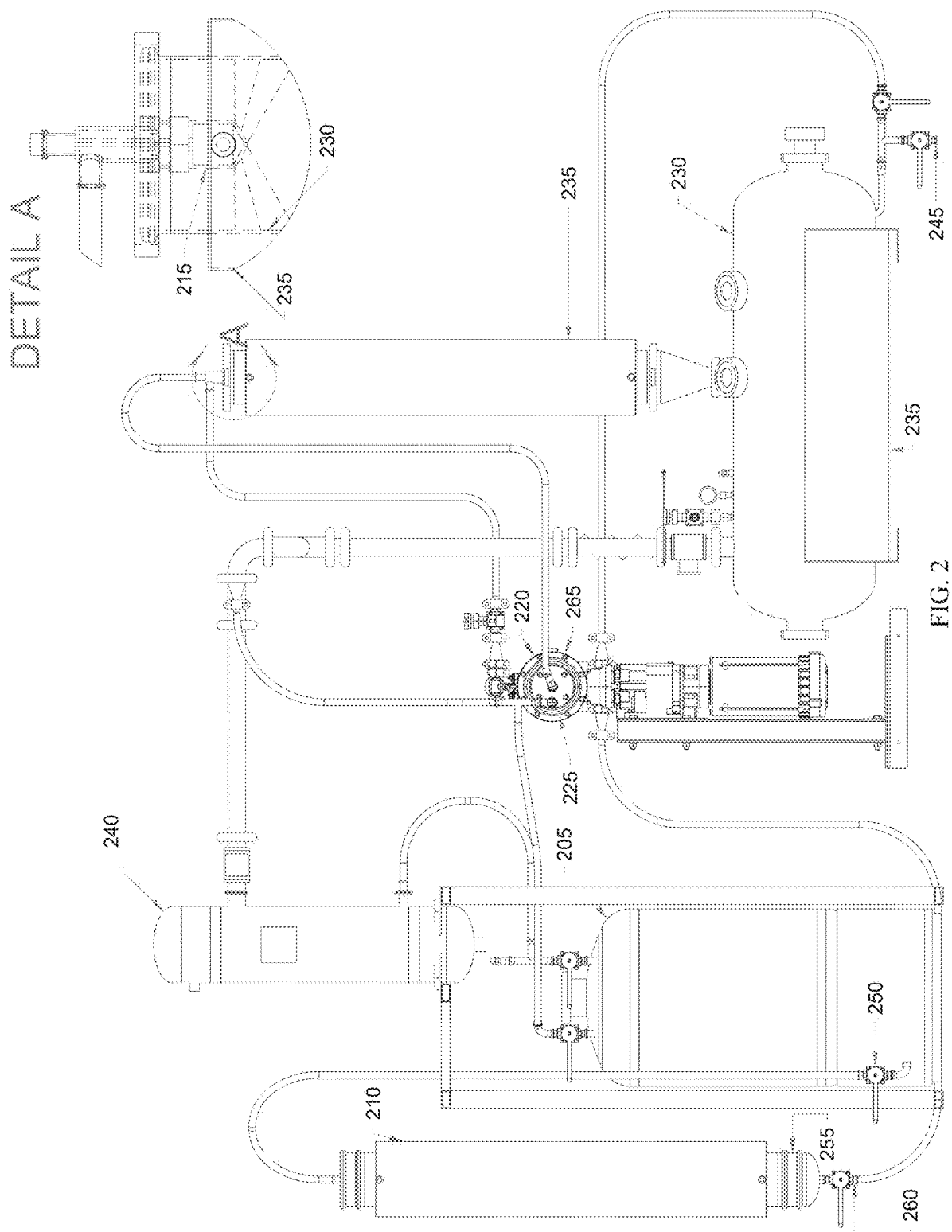
FIG. 2 shows a schematic view of the system of the present disclosed technology according to one embodiment.

Referring now to FIG. 2, FIG. 2 shows a schematic view of the system of the present disclosed technology according to one embodiment. The present disclosed technology provides a system 200 for extracting botanical herbal oil. The system 200 includes a first pressure vessel 205, a second pressure vessel 210, an atomizer 215, a liquid transfer pump 220, a vapor transfer pump 225, an evaporation chamber 230 a vaporizer 235, a condenser 240, and a drain 245. In some embodiments, the system 200 includes a second drain 250, a filter 255, a third drain 260, and a pump 265.

In embodiments, the first pressure 205 vessel chills a solvent to condense at least a portion of the solvent into its liquid phase to form the liquid solvent for the purposes of washing and extracting botanical herbal oils from plant material. The first pressure vessel 205 also contains any gaseous or vapor solvent not condensed into its liquid phase. The second pressure vessel 210 soaks plant material with a liquid solvent to wash and extract botanical herbal oil from the plant material and form a solvent-oil extract solution.

The atomizer 215 atomizes the solvent-oil extract solution with a vapor solvent to form an atomized mixture comprising small particulates or droplets of the solvent-oil extract solution, as shown in DETAIL A. The atomizer 215 also transfers the atomized mixture to the evaporation chamber 230, as shown in DETAIL A. In embodiments, the atomizer 215 is a dual port sprayer including a first port, a second port, and an injection nozzle. The first port receives the solvent-oil extract solution. The second port receives the vapor solvent. The injection nozzle atomizes the solvent-oil extract solution with the vapor solvent into very fine particulates or droplets.

The liquid transfer pump 220 draws and transfers, or pumps, the solvent-oil extract solution to the atomizer 215. The vapor transfer pump 225 draws and transfers, or pumps, the vapor solvent to the atomizer 215. In embodiments, the vapor transfer pump 225 draws the solvent from the first pressure vessel 205. In one embodiment, the pump comprises a split diaphragm pump, as shown in FIG. 2, in which a first side pumps liquid, e.g., liquid transfer pump, and a second side pumps vapor, e.g., vapor transfer pump.

The evaporation chamber 230 receives the atomized mixture from the atomizer 215 and contains the atomized mixture therein. The vaporizer 235 vaporizes the liquid solvent from the atomized mixture to isolate the botanical herbal oil from the solvent-oil extract solution. In some embodiments, the vaporizer 235 comprises a heated tube, a boiler, a heat water vessel, or a pressure generator that increases the pressure in the evaporation chamber 230. In some embodiments, the evaporation chamber 230 and the vaporizer 235 are the same vessel. In other embodiments, the first pressure vessel 205, the second pressure vessel 210, the evaporation chamber 230, and the vaporizer 235 are jacketed or include a heated jacket, to speed up the extraction process.

The condenser 240 condenses the liquid solvent vaporized from the atomized mixture back to a liquid solvent. In some embodiments the condenser 240 comprises a heat exchanger. The drain 245 drains the botanical herbal oil from the evaporation chamber 230. The second drain 250 drains the liquid solvent from the first pressure vessel 205 to the second pressure vessel 210. The filter 255 filters the solvent-oil extract solution from the plant material. In embodiments, the filter 225 comprises a desiccant, a basket strainer, filtration plate, a sand filter, gravel filter, silica filter, a glass filter, carbon filter, screen gasket, or any combination thereof. The third drain 260 drains the solvent-oil extract solution from the second pressure vessel 210. The pump 265 draws and transfers, or pumps, the liquid solvent vaporized from the atomized mixture to the condenser 240 and to the first pressure vessel 205. The pump 265 utilizes a tee and valve to control flow. In some embodiments, the pump 265 is the same as the vapor transfer pump 225, or is the vapor transfer pump 225, as shown in FIG. 2. In some embodiments, the drains 245, 250, 260 comprise drain valves. In other embodiments, the drains 245, 250, 260 comprise pumps that draw and transfer fluids.

The present technology can be carried out with one or more of the embodiments described. The drawings show embodiments with the understanding that the present description is to be considered an exemplification of the principles and is not intended to be exhaustive or to limit the disclosure to the details of construction. The arrangements of the components are set forth in the following description or illustrated in the drawings.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

We claim:

1. A method of extracting botanical herbal oil, comprising:
   washing botanical herbal oil from plant material with a liquid solvent to form a solvent-oil extract solution;
   pumping the solvent-oil extract solution to an atomizer;
   pumping a vapor solvent to the atomizer;
   atomizing the solvent-oil extract solution with the vapor solvent via the atomizer to form an atomized mixture;
   vaporizing the liquid solvent from the atomized mixture to isolate the botanical herbal oil from the solvent-oil extract solution.

2. The method of claim 1, further comprising:
   pumping the solvent-oil extract solution to the atomizer with a liquid transfer pump; and
   pumping the vapor solvent to the atomizer with a vapor transfer pump.

3. The method of claim 2, further comprising transferring the atomized mixture into an evaporation chamber with the atomizer before vaporizing the liquid solvent from the atomized mixture.

4. The method of claim 3, further comprising chilling a solvent in a first pressure vessel until at least a portion of the solvent condenses into a liquid to form the liquid solvent.

5. The method of claim 4, further comprising soaking the plant material with the liquid solvent in a second pressure vessel before washing the botanical herbal oil from the plant material.

6. The method of claim 5, further comprising transferring the liquid solvent from the first pressure vessel into the second pressure vessel containing the plant material to begin the soaking.

7. The method of claim 6, further comprising filtering the solvent-oil extract solution from the plant material to separate the solvent-oil extract solution from the plant material before pumping the solvent-oil extract solution to the atomizer.

8. The method of claim 7, further comprising pumping the solvent-oil extract solution from the second pressure vessel to the atomizer after the solvent-oil extract solution is filtered from the plant material.

9. The method of claim 8, further comprising draining the botanical herbal oil from the evaporation chamber for further processing.

10. The method of claim 9, further comprising condensing the liquid solvent vaporized from the atomized mixture back to a liquid solvent.

11. The method of claim 10, further comprising condensing the liquid solvent vaporized from the atomized mixture back to a liquid solvent with a heat exchanger.

12. The method of claim 4, wherein the liquid solvent and the vapor solvent are acquired from the solvent.

13. The method of claim 12, wherein:
the liquid solvent is drawn from a bottom portion of the first pressure vessel containing the liquid solvent; and
the vapor solvent is drawn from an upper portion of the first pressure vessel containing the vapor solvent.

14. The method of claim 1, wherein the atomizer is a dual port sprayer comprising:
a first port to receive the solvent-oil extract solution;
a second port to receive the vapor solvent; and
an injection nozzle to atomize the solvent-oil extract solution with the vapor solvent.

15. The method of claim 1, wherein the liquid solvent and the vapor solvent is propane, butane, hexane, ethanol methanol, ether, dimethylformamide, carbon dioxide, water, N-propanol, butanol, dichloromethane, carbon disulfide, glycerol, acetone, carbon tetrachloride, cyclohexane, formic acid, toluene, anisole, pyridine, acetic acid, xylene, trifluoroacetic acid, dimethyl sulfoxide, benzene, nitrobenzene, quinoline, dibutyl phthalate, tetrahydrofuran, petroleum ether, or any combination thereof.

16. A botanical herbal oil extraction system, comprising:
a first pressure vessel to chill a solvent;
a second pressure vessel to soak plant material with a liquid solvent of the solvent to extract botanical herbal oil from the plant material and form a solvent-oil extract solution;
an atomizer to mix the solvent-oil extract solution with a vapor solvent of the solvent to form an atomized mixture and to transfer the atomized mixture;
a liquid transfer pump to pump the solvent-oil extract solution to the atomizer;
a vapor transfer pump to pump the vapor solvent to the atomizer;
an evaporation chamber to receive the transferred atomized mixture and to contain the atomized mixture;
a vaporizer to vaporize the liquid solvent from the atomized mixture to isolate the botanical herbal oil from the solvent-oil extract solution;
a condenser to condense the liquid solvent vaporized from the atomized mixture back to a liquid solvent; and
a drain to drain the botanical herbal oil from the evaporation chamber.

17. The system of claim 16, wherein:
the first pressure vessel contains the liquid solvent and the vapor solvent; and
the vapor transfer pump draws the vapor solvent from the first pressure vessels and pumps the vapor solvent to the atomizer.

18. The system of claim 16, further comprising:
a second drain to drain the liquid solvent from the first pressure vessel to the second pressure vessel;
a filter to filter the solvent-oil extract solution from the plant material;
a third drain to drain the solvent-oil extract solution from the second pressure vessel; and
a pump to pump the liquid solvent vaporized from the atomized mixture to the condenser and to the first pressure vessel.

19. The system of claim 16, wherein the atomizer is a dual port sprayer comprising:
a first port to receive the solvent-oil extract solution;
a second port to receive the vapor solvent; and
an injection nozzle to atomize the solvent-oil extract solution with the vapor solvent.

20. The system of claim 19, wherein the condenser comprises a heat exchanger.

* * * * *